United States Patent [19]
Bühler et al.

[11] Patent Number: 4,715,041
[45] Date of Patent: Dec. 22, 1987

[54] BATH ELECTRODE FOR POT FURNACE

[75] Inventors: Karl Bühler; Anton Menth, both of Nussbaumen, Switzerland

[73] Assignee: BBC Brown, Boveri & Company, Limited, Baden, Switzerland

[21] Appl. No.: 746,882

[22] Filed: Jun. 20, 1985

[30] Foreign Application Priority Data

Jul. 6, 1984 [CH] Switzerland .................. 3274/84

[51] Int. Cl.$^4$ ............................................. H05B 7/02
[52] U.S. Cl. ..................................... 373/72; 373/108
[58] Field of Search .................. 164/250.1, 508, 514; 373/43, 71, 72, 79, 83, 84, 108; 266/242; 432/156, 157

[56] References Cited

U.S. PATENT DOCUMENTS

| Re. 17,954 | 2/1931 | Mills | 373/72 |
|---|---|---|---|
| 1,100,993 | 6/1914 | Snyder | 373/72 |
| 1,271,093 | 7/1918 | Snyder | 373/72 |
| 4,145,562 | 3/1979 | Stenkvist | 373/108 X |

FOREIGN PATENT DOCUMENTS

| 2550671 | 5/1976 | Fed. Rep. of Germany | 373/72 |
|---|---|---|---|
| 0002790 | 1/1898 | United Kingdom | 373/71 |

*Primary Examiner*—Roy N. Envall, Jr.
*Attorney, Agent, or Firm*—Oblon, Fisher, Spivak, McClelland & Maier

[57] ABSTRACT

To assure a high degree of operating reliability during operation of pot furnaces, their bath electrode (2, 14, 17, 20) in the pot (1) must be cooled intensively by external cooling. If the pot (1) is in the pot furnace station, cooling of the bath electrode (2, 14, 17, 20) is not a problem. But the case is different when the pot (1) is transported to various stations which can be geographically far apart—e.g., on the one hand, to a melting furnace and, on the other hand, to a continuous casting machine. In the latter case, feed and removal devices for a coolant have been constantly carried with the pot (1). However, this makes a considerable expense necessary. By the dimensioning according to the invention of the bath electrode (1, 14, 17, 20) and/or by attachment of additional cooling bodies (15, 18, 22, 14), the bath electrode (2, 14, 17, 20) can be successfully uncoupled from external cooling (8, 9, 10) over the relatively long handling period that is necessary for operational requirements. By the steps according to the invention, the bath electrode (2, 14, 17, 10) can be kept under the critical temperature during the period of uncoupling from the cooling (8, 9, 10), e.g., in the area of its electric connection (11). Moreover, by said steps the liquid/solid boundary layer between the melt (4) and the front surface of the bath electrode (2, 14, 17, 20) can be kept stable in position at the end of the preset time of the uncoupling in comparison with the beginning of the uncoupling.

10 Claims, 12 Drawing Figures

BATH ELECTRODE FOR POT FURNACE

FIELD OF THE INVENTION

The invention is based on a process for increasing the operating reliability of a pot furnace with at least one power electrode and at least one bath electrode that is cooled directly or indirectly at least during the heat-up of the melt.

BACKGROUND OF THE INVENTION

The invention relates to prior art such as is known, e.g., from CH Patent Application No. 4135/83-3 of 7/28/1983.

In the case of arc furnaces and pot furnaces, the bottom and bath electrode, respectively, is exposed to a constant very high thermal stress and is cooled mainly by a liquid cooling. Especially in the melt-down phase in arc furnaces or in the heat-up phase in pot furnaces, the resulting heat loss results in a relatively large thermal flow in the bottom or bath electrode, respectively, in the direction of the furnace vessel or pot bottom, respectively. The varying thermal flow in the bottom or bath electrode, respectively, means, with constant length of the bottom or bath electrode, a varying temperature difference between its cooled zone and the zone in contact with the melt. But with still greater heat supply, no higher temperature difference is present, since the electrode cannot be hotter on the inside than the melting temperature. In other words, more heat can be conveyed only if the electrode becomes shorter—i.e., melts. With insufficient cooling or stopping of the cooling, the operating reliability of the furnace operation is no longer fully guaranteed, since the electrode, in this case, could melt to the extent that there is the danger of a melting breakthrough. With arc furnaces a forced cooling (e.g., a liquid cooling of the bottom electrode, since the furnace is stationary) can be continuously maintained.

However, in the case of pot furnaces, cooling of the bath electrode is more problematical because of the nonstationary operating condition. In the melt heat-up station at the continuous casting machine, in the metallurgical treatment station possibly present, and at the melting furnace, the pot can be constantly connected to forced external cooling from the outside. During transport of the pot to the individual places mentioned above (which are often geographically far from one another), cooling of the bath electrode is costly, since, e.g., the hoses for feeding and removal of the coolant necessary for the cooling must constantly be carried with the pot.

OBJECT OF THE INVENTION

The object of the invention is to provide a process for improving the operating reliability of the pot of a pot furnace the bath electrode of which is so designed that, at least during the time of handling of the pot, it can be kept below a preset critical temperature without external cooling from the outside.

ADVANTAGES OF THE INVENTION

An advantage of the invention consists in the fact that a simpler transport of the pot is achieved without carrying along feed and removal conduits for a coolant of an external cooling device.

A further advantage of the invention is that an operationally reliable handling of the pot can be performed in the in-between periods in which the outside forced cooling is not connected to the bath electrode.

Moreover, a reduction in the oxidation of the contact surfaces on the electric connections results, since a preset critical temperature is not exceeded.

Dimensioning of the bath electrode on the basis of formula given hereafter makes possible an exact predetermination in regard to the desired handling time without outside cooling.

A further advantage of the subject invention is that achievement of the above mentioned object is made possible by simple design means.

The invention allows the bath electrode to be produced in one piece, and no additional constructive connecting means are required.

A still further advantage of the invention is that it makes it possible to reuse the cooling body when the consumed bath electrode is replaced.

The replaceable connection of the cooling bodies with the bath electrode allows an exchange of cold cooling bodies for those that are already heated. As a result, the time the pot can remain without outside cooling can be increased. In this connection, the cooling bodies can be pressed onto the bath electrode by a hydraulic device. It is also conceivable to fasten the cooling bodies to the bath electrode by jamming or bolting.

Due to the design of the cooling body as an electric connection, two functions are combined in one part.

A further advantage of the invention is that, by using salts that melt at preset temperatures, heat for the melting process is removed from the cooling body. Thus, a cooling effect is attained without temperature increase.

By the use of cooling bodies with a relatively high heat conductivity, good heat dissipation from the bath electrode is achieved.

By a design of the cooling bodies disclosed hereinafter, the variation of the position of the solid/liquid melting boundary on the front surface of the electrode is kept small. In addition, the temperature increase on cooling surface A is delayed.

BRIEF DESCRIPTION OF THE DRAWINGS

The invention is explained more in detail below with reference to the embodiments shown in the drawings.

FIG. 2b is a temperature-length diagram corresponding to FIG. 2a.

FIG. 3b is a temperature-length diagram corresponding to FIG. 3a.

FIG. 4 is a temperature difference-time diagram corresponding to FIGS. 2a and 3a.

FIG. 6b is a temperature-length diagram corresponding to FIG. 6a.

DETAILED DESCRIPTION OF THE PRESENTLY PREFERRED EMBODIMENTS

Figure 1:
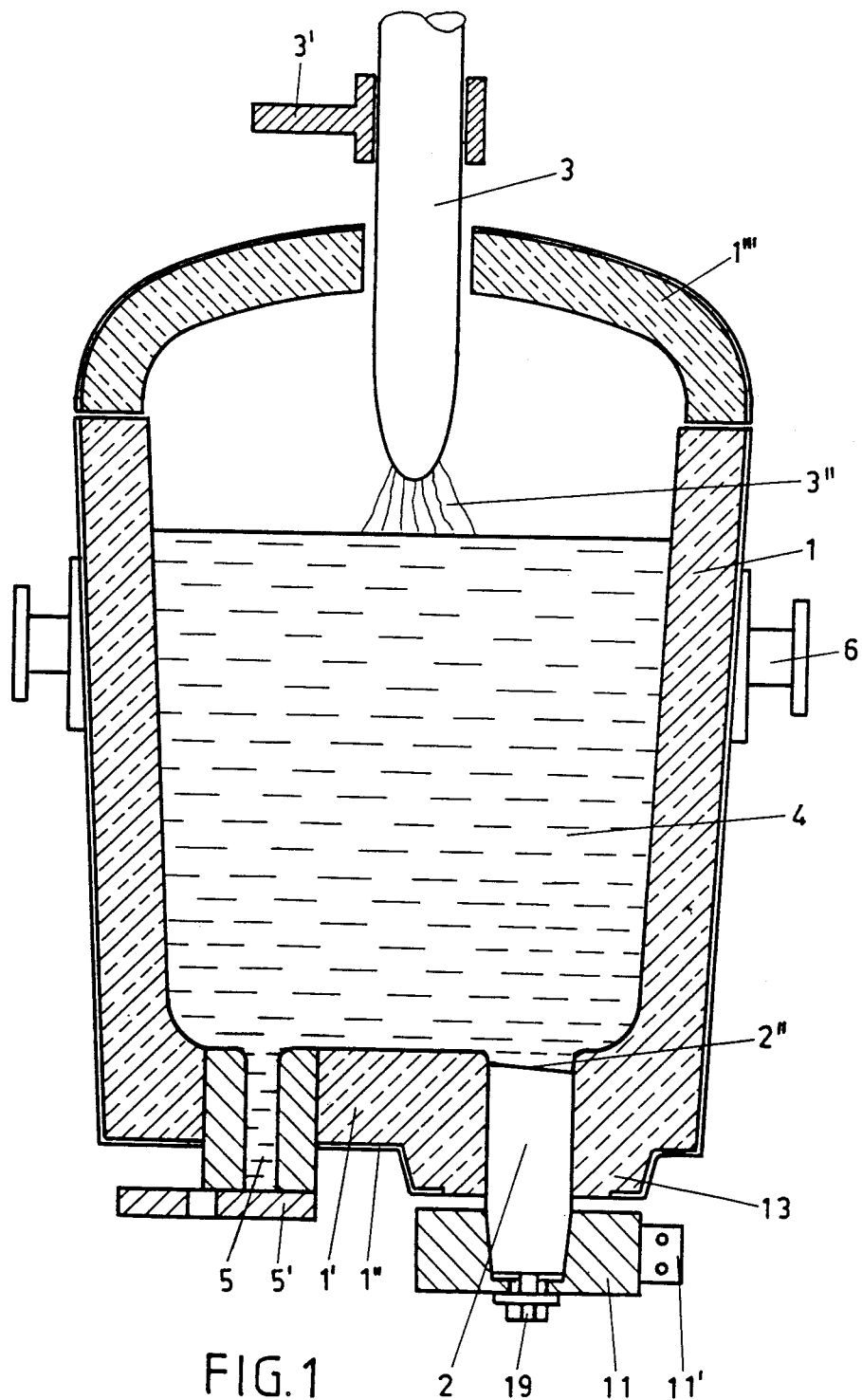
FIG. 1 is a diagrammatic vertical section through a pot of a pot furnace.

A pot furnace is shown in a diagrammatic representation in FIG. 1. All parts not serving for the immediate understanding of the invention have been left out. This pot furnace essentially consists of a pot 1, with a refractory lining 1', a pot bottom 1", and a lid 1''' through which a power electrode 3 projects through an opening. In the pot bottom 1" is placed a bath electrode 2, 2" on whose lower end is fastened a cooling body 11 by a screw 19 on the bath electrode 2, 2". The solid part of the bath electrode 2, 2" is designated by 2 and its liquid part by 2". In the embodiment according to FIG. 1, the cooling body 11 at the same time acts as an electric connection of the bath electrode 2, 2", and therefore it is provided with an electric connecting plate 11'. Further, a bottom taphole 5 for tapping of melt 4 is provided in the pot bottom 1", whereby the bottom taphole 5 can be opened or closed by a gate plate 5'. The power electrode 3 is held by an electrode support arm 3'. An arc 3" is formed between the tip of the power electrode 3 and the surface of the melt 4. As can be clearly seen in FIG. 1, the pot bottom 1" is provided with a bulge 13 that surrounds the bath electrode 2, 2". Transport of the pot 1 is performed, for example, by a crane by means of a tiltable suspension 6.

Figure 2A:
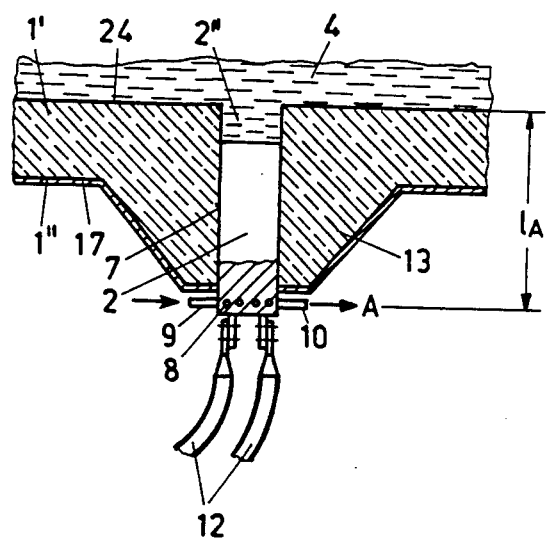
FIG. 2a is a partial vertical section through the pot bottom in the area of the bath electrode in a first embodiment according to the invention.

FIG. 2a shows the bath electrode 2, 2", which is in an opening 7 in the pot bottom 1", and the bulge 13 in the pot bottom 1" surrounding the bath electrode 2, 2". In surface 7 of the bath electrode 2, 2", which is indicated by arrows, is provided a liquid cooling which consists essentially of cooling ducts, a liquid feed pipe 9, and a liquid removal pipe 10.

The bath electrode 2, 2" is connected on its lower face to an electric connecting cable 12.

The total length of the bath electrode 2, 2" from hearth surface 24 to cooling surface A is indicated by $l_A$.

Figure 2B:
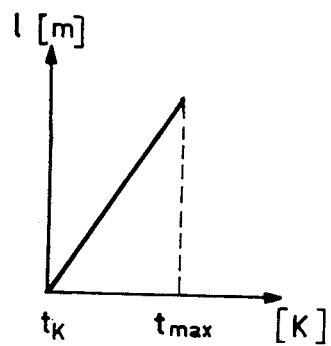

FIG. 2b represents the temperature course within the bath electrode 2, 2" from the cooling surface A to the hearth surface 24, during the time of coupled cooling to the beginning of uncoupling. $t_K$ indicates the temperature of the bath electrode 2, 2" at the cooling surface A, and $t_{max}$ indicates the temperature of the bath electrode 2, 2" at the hearth surface 24. In the embodiment of the bath electrode 2, 2" according to FIG. 2a, the temperature course within the electrode 2, 2" occurs linearly.

Figure 3A:
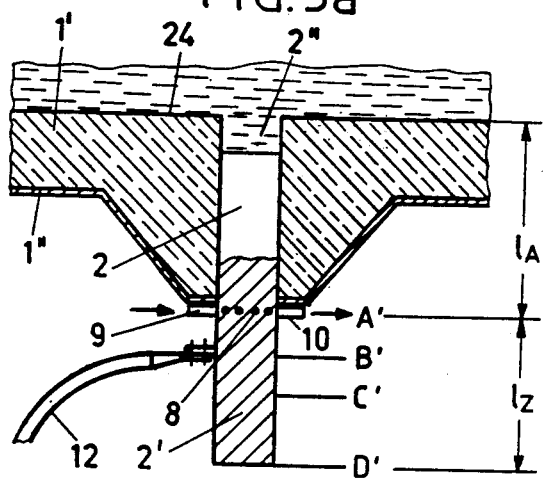
FIG. 3a is a partial vertical section through the pot bottom in the area of the bath electrode in a second embodiment according to the invention.

FIG. 3a shows a bath electrode 2, 2", which exhibits an extension 2' beyond its cooling surface A'. $l_A$ again indicates the length of the part of the bath electrode 2, 2" from the hearth surface 24 to the cooling surface A', and $l_Z$ indicates the length of the extended part 2' of the bath electrode 2, 2". In the extended part 2', various electrode surfaces are indicated by B', C' and D'. More detailed reference will be made to these electrode surfaces in FIG. 4. The electric connecting cable 12 is laterally attached to the extended part 2' of the bath electrode 2, 2".

Figure 3B:
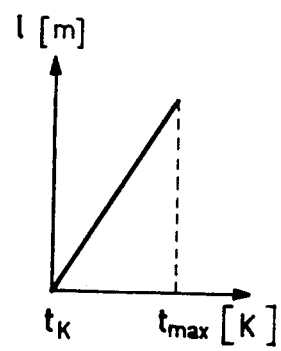

FIG. 3b shows the same linear temperature curve, as was shown and described in FIG. 2b, for the bath electrode according to FIG. 3a.

Figure 4:
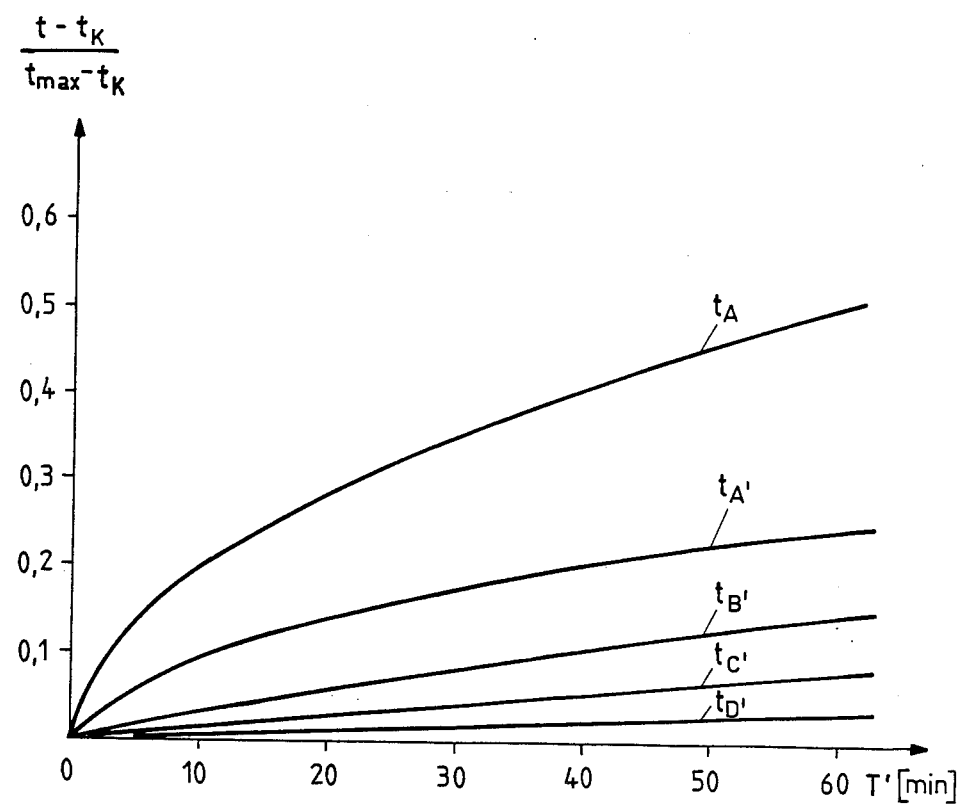

In the diagram according to FIG. 4, the ratio of the temperature difference between temperature t at time T' after the beginning of the uncoupling and temperature $t_K$ at the beginning of uncoupling in the cooling surface A, A' to the temperature difference between maximum temperature $t_{max}$ in the hearth surface 24 and temperature $t_K$ at the beginning of uncoupling A, A' is indicated on the ordinate. Time T' is indicated on the abscissa in minutes.

Curve $t_A$ shows for a bath electrode 2, 2' made of iron material the chronological course of the temperature in cooling surface A after interruption of the external cooling, in the present case of a liquid cooling according to FIG. 2a, for a bath electrode 2, 2" that is 0.5 m long. Curve $t_{A_1}$ shows for a bath electrode 2, 2" according to FIG. 2a made of iron material the chronological course of the temperature in cooling surface A after interruption of the external cooling for an electrode 1 m long. With the extension from 0.5 m to 1.0 m, it is achieved that, for example, for a ratio of temperature differences of 0.2 (i.e., a factor with a high adequate operating reliability with appropriate designing), the time the bath electrode 2, 2" of the pot 1 can be without external cooling can be raised from 10 minutes to 40 minutes.

The thickness of the refractory lining 1' of the pot bottom 1" in a newly lined pot 1 normally amounts to 30 to 40 cm. Depending on the size of the pot, the refractory lining wears under operating conditions, and its thickness amounts, e.g., to only 20 to 30 cm after a certain operating period. The bath electrode 2, 2" must, of course, be so designed that, even in case of a greatly worn refractory lining 1' of the pot bottom 1", it can get by with high operating reliability for a relatively long period without external cooling. This is achieved by the pot bottom 1" being provided with the bulge 13. By this design step, the length of the bath electrode 2, 2" can also be enlarged from the hearth surface 24 to the cooling surface A. Under the same temperature conditions and with the assurance of adequate operating reliability, it is considered that the time the bath electrode 2, 2" of the pot 1 can be without external cooling is proportional to the square of the length of the bath electrode 2, 2".

Still better periods without external cooling are obtained by the bath electrode 2, 2" being extended beyond its cooling surface A. According to curves $T_{A'}$, $t_{B'}$, $T_{C'}$ and $T_{D'}$ in FIG. 4, which corresponds to surfaces A', B', C', and D' in FIG. 3a of an electrode, e.g., 0.5 m ($l_A$) plus 0.5 m ($l_Z$) long, the operating reliability of the bath electrode 2, 2" without external cooling is improved. This is expressed in a reduction of the ordinate ratio of the temperature differences in the case of a preset stay period of the bath electrode 2, 2" of the pot 1.

Figure 5:
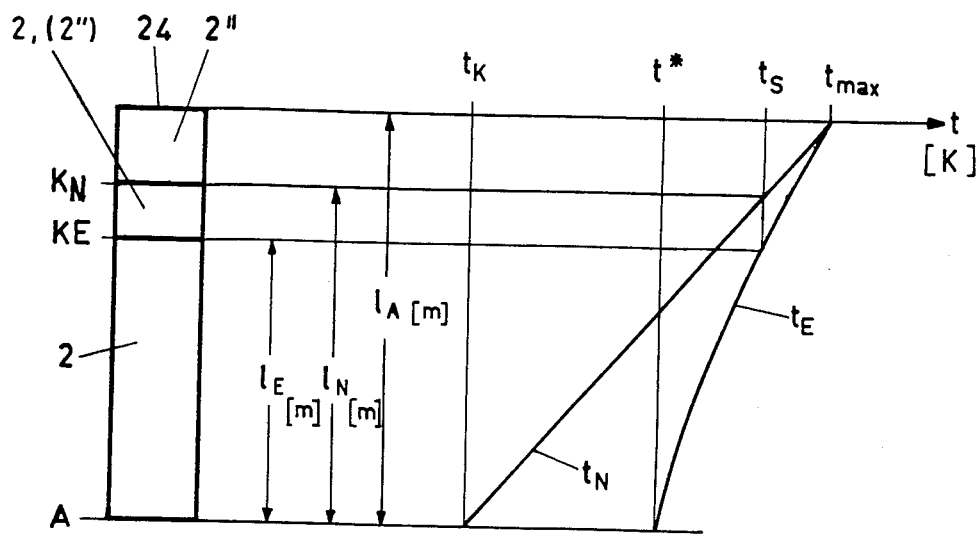
FIG. 5 is a diagrammatic temperature-time diagram for the beginning and end of the uncoupling of the external cooling.

FIG. 5 represents a bath electrode 2, 2" and the temperature ratios over its axial length from the hearth surface 24 to the cooling surface A, namely from the beginning of the uncoupling of the external cooling to the end of the uncoupling. As before, 2 indicates the solid part of the electrode, and 2" indicates the liquid part. $k_A$ is the front surface of the solid part 2 of the bath electrode 2, 2" at the beginning of uncoupling of the external cooling, $k_E$ is the front surface of the solid part 2 of the bath electrode 2, 2″ at the end of uncoupling of the external cooling, $l_A$ is the total length of the bath electrode 2, 2″ from the hearth surface 24 to the cooling surface A, $l_N$ is the length of the solid part 2 of the bath electrode 2, 2″ at the beginning of the uncoupling of the external cooling, and $l_E$ is the length of the solid part 2 of the bath electrode 2, 2″ at the end of uncoupling of the external cooling. $t_K$ is the temperature at the cooling surface A at the beginning of uncoupling, $t^*$ is the critical temperature, $t_S$ is the melting temperature of the bath electrode 2, 2″, and $t_{max}$ is the maximum temperature at the hearth surface 24. $t_N$ is the axial temperature distribution within the bath electrode 2, 2″ at the beginning of uncoupling of the external cooling, and $t_E$ is the temperature distribution within the bath electrode 2, 2″ at the end of uncoupling of the external cooling.

The formula for the curve shown in FIG. 4 may be derived based on the Fourier law of heat conduction. While the derivation will not be given here, the critical temperature $t^*$ is determined by the formula:

$$\frac{t^* - t_K}{t_{max} - t_K} = 1 - \left\{ \frac{8}{\pi^2} \cdot \frac{l_A + l_Z}{l_A} \cdot \left[ \sin^2 \frac{\pi \cdot l_A}{2(l_A + l_Z)} \cdot 1^{-2} \cdot e^{-\frac{1^2 \pi^2 \lambda \cdot T}{4c(l_A+l_Z)^2}} + \sin^2 \frac{3 \cdot \pi \cdot l_A}{2(l_a + l_Z)} \cdot 3^{-2} \cdot e^{-\frac{3^2 \pi^2 \lambda \cdot T}{4c(l_A+l_Z)^2}} + \sin^2 \frac{5 \cdot \pi \cdot l_A}{2(l_A + l_Z)} \cdot 5^{-2} \cdot e^{-\frac{5^2 \pi^2 \lambda \cdot T}{4c(l_A+l_Z)^2}} + \ldots \right] \right\}$$

wherein ($t_{max}$) is the temperature in degrees K of the bath electrode at the hearth surface, ($t_K$) is the temperature in degrees K at the cooling surface at the beginning of uncoupling of the external cooling, (T) is the uncoupling time in seconds, ($l_A$) is the length of the bath electrode from the hearth surface to the cooling surface in meters, ($\lambda$) is the heat conductivity of the bath electrode in W/K·m, and (c) is the specific heat capacity of the bath electrode in W·s/m²·K. Additionally, the length of the time during which the cooling surface A of the bath electrode 2 remains below the critical temperature $t^*$ is determined by the formula:

$$\frac{t^* - t_K}{t_{max} - t_K} = 1 - \left\{ \frac{8}{\pi^2} \left[ 1^{-2} \cdot e^{-\frac{1^2 \pi^2 \lambda \cdot T}{4c \cdot l_A^2}} + 3^{-2} \cdot e^{-\frac{3^2 \pi^2 \lambda \cdot T}{4c \cdot l_A^2}} + 5^{-2} \cdot e^{-\frac{5^2 \pi^2 \lambda \cdot T}{4c \cdot l_A^2}} + \ldots \right] \right\}$$

wherein ($t_{max}$) is the temperature in degrees K of the bath electrode at the hearth surface, ($t_K$) is the temperature in degrees K at the cooling surface at the beginning of uncoupling of the external cooling, (T) is the uncoupling time in seconds, ($l_A$) is the length of the bath electrode from the hearth surface to the cooling surface in meters, ($\lambda$) is the heat conductivity of the bath electrode in W/K·m, and (c) is the specific heat capacity of the bath electrode in W·s/m²·K.

As FIG. 5 shows, the length of the solid part 2 of the bath electrode 2, 2″ is reduced as a result of the increase of temperature from $t_N$ to $t_E$ or the increase of temperature at the cooling surface A from $t_K$ to $t^*$ from $l_N$ to $l_E$.

Another criterion for the critical temperature $t^*$ is the temperature at the electric connector, which, e.g., could oxidize when critical temperature $t^*$ is exceeded.

Another criterion for the critical temperature $t^*$ is the temperature of the cooling surface at the end of uncoupling—i.e., when the external cooling device is recoupled. In case of too high a temperature, damages can occur in the cooling surface A by a temperature shock or disturbances as a result of the explosion like evaporation of the reentering coolant.

Figure 6A:
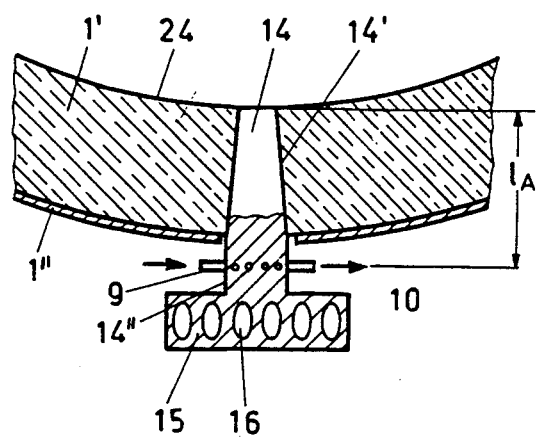
FIG. 6a is a first embodiment according to the invention of a bath electrode with a cooling body in which the bath electrode is tapered in the direction of the hearth surface.

FIG. 6a shows another embodiment according to the invention of a bath electrode 14, which exhibits a conical part 14′, a cylindrical part 14″, and a one-piece cooling body 15 connected to the bath electrode 14. In the cooling body 15 are provided openings 16 which, e.g., can be filled with a salt with a preset melting temperature. When a determined limiting temperature in the cooling body 15 is exceeded, the salt melts, and the melting heat required for this is dissipated from the cooling body 15 and cools it.

Figure 6B:
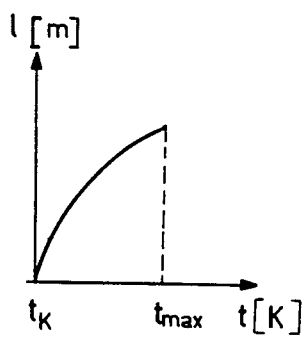

The temperature distribution over length $l_A$ of the bath electrode 14 is represented in FIG. 6b. Because of the smaller temperature gradients on the outside, a delaying effect results in the temperature rise within the bath electrode 14 on the crosswise tapering of the bath electrode in the direction of the hearth surface.

Figure 7:
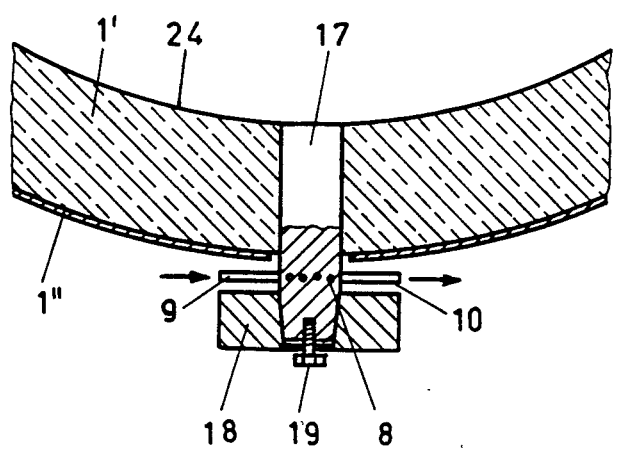
FIG. 7 is a second embodiment according to the invention of a bath electrode with a cooling body.

FIG. 7 shows another advantageous embodiment according to the invention of a bath electrode 17 with a cooling body 18. In this embodiment, the cooling body 18 is screwed to the bath electrode 17 by the screw 19. As a result, the cooling body 18 is easy to attach or detach. The cooling body 18 could just as easily be clamped or slipped on. Because of this relatively easy replaceability of the cooling body 18, during the time when the bath electrode 17 is without external cooling, a heated cooling body 18 can be replaced by a cold one.

By this means, the time that the bath electrode 17 has good operating reliability without cooling after uncoupling from external cooling can be multiplied.

Figure 8:
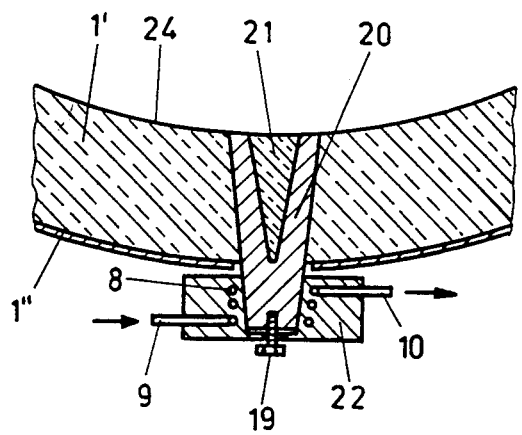
FIG. 8 is a third embodiment according to the invention of a bath electrode with a cooling body, in which the electrically conductive cross section of the bath electrode is tapered in the direction of the hearth surface, and the diameter increases in the direction of the hearth surface.

Another embodiment according to the invention of a bath electrode 20 can be seen in FIG. 8. In this connection, a cooling body 22 is provided with a liquid cooling 8, 9, 10, and the bath electrode 20 is cooled indirectly. The cooling body 22 can, when the pot 1 with the bath electrode 20 is at a station where there is an the external cooling device, be cooled by the coolant removal pipe 10 being coupled and again uncoupled. Buth on the other hand, the cooling body 22 can also be dismounted and replaced by another without liquid cooling. A funnel-shaped filling with a refractory material 21 within the bath electrode 20 serves for crosswise reduction of the electrically conductive part of the bath electrode 20 in its front surface in the hearth surface 24 in comparison with the cross section of the bath electrode 20 outside the pot bottom 1′. This results in a temperature delay within the electrode 20 in the direction of the pot bottom 1′ after uncoupling of an external cooling. This has a favorable effect on the handling time of the pot without external cooling. For a better overall view, the electric connector on the bath electrode 20 is not shown in FIG. 8.

Figure 9:
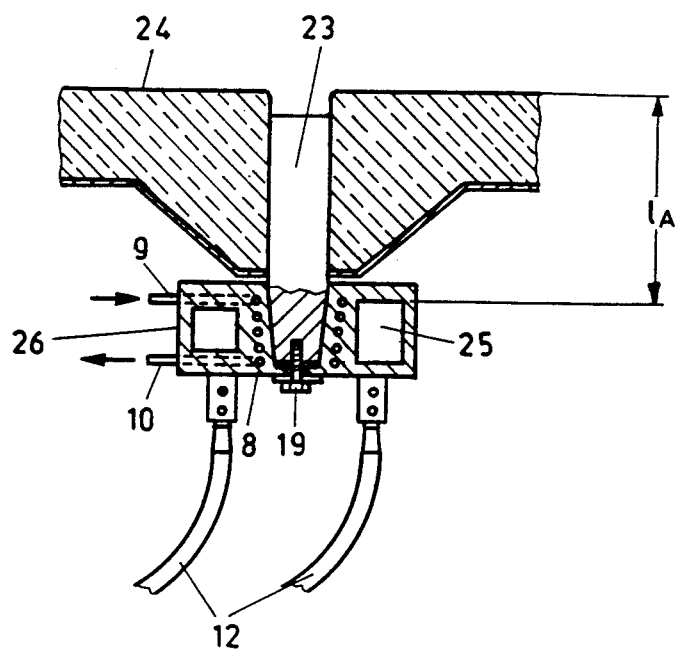
FIG. 9 is a fourth embodiment according to the invention of a bath electrode with a cooling body, in which the cooling body at the same time forms an electric connecting piece, is cooled externally, and is provided with cooling chambers filled, e.g., with salt.

FIG. 9 shows another embodiment according to the invention of a bath electrode 23. In this connection, a cooling body 26 is replaceably connected by the screw 19 to the lower part of the bath electrode 23. The cooling body 26 cools the bath electrode 23, but at the same time it also serves as the electric connecting piece for the bath electrode 23. In addition to liquid cooling 8, 9, 10, the cooling body 26 exhibits cooling chambers 25, into which, e.g., a suitable salt mixture can be fed and which, as already mentioned above, contributes to increasing the cooling effect.

Cooling according to the invention of the bath electrodes 2, 14, 17, and 20 of the pot 1 of a pot furnace is, of course, not limited merely to arc heating, but can also be used with equal success for plasma heating of the pot furnace.

We claim:

1. A hot furnace comprising:
   (a) a pot containing a melted metal having a surface;
   (b) at least one power electrode;
   (c) at least one bath electrode; and
   (d) an external cooling device for cooling a cooling surface of said at least one bath electrode, wherein:
   (e) the occurrence of a critical temperature (t*) at said cooling surface of said at least one bath electrode is delayed by the provision of the extension of said at least one bath electrode and a bulge of said pot surrounding said at least one bath electrode and
   (f) the time during which said cooling surface of said at least one bath electrode remains below the critical temperature (t*) in degrees K. at said cooling surface of said at least one bath electrode is determined by the formula:

$$\frac{t^* - t_K}{t_{max} - t_K} = 1 - \left\{ \frac{8}{\pi^2} \cdot \frac{l_A + l_Z}{l_A} \cdot \left[ \sin^2 \frac{\pi \cdot l_A}{2(l_A + l_Z)} \cdot \right.\right.$$
$$1^{-2} \cdot e^{-\frac{12 \cdot \pi^2 \cdot \lambda \cdot T}{4c(l_A + l_Z)^2}} + \sin^2 \frac{3 \cdot \pi \cdot l_A}{2(l_a + l_Z)} \cdot 3^{-2} \cdot e^{-\frac{32 \cdot \pi^2 \cdot \lambda \cdot T}{4c(l_A + l_Z)^2}} +$$
$$\left.\left. \sin^2 \frac{5 \cdot \pi \cdot l_A}{2(l_A + l_Z)} \cdot 5^{-2} \cdot e^{-\frac{52 \cdot \pi^2 \cdot \lambda \cdot T}{4c(l_A + l_Z)^2}} + \ldots \right]\right\}$$

wherein ($t_{max}$) is the temperature in degrees K. of said at least one bath electrode at the surface of the melted metal, ($t_K$) is the temperature in degrees K. at at said cooling surface of said at least one bath electrode at the beginning of uncoupling of the external cooling, (T) is the uncoupling time in seconds, ($l_A$) is the length of said at least one bath electrode from the surface of the melted metal to said cooling surface of said at least one bath electrode in meters, ($l_Z$) is the length of the extension of said at least one bath electrode beyond said cooling surface in meters, ($\lambda$) is the heat conductivity of said at least one bath electrode in W/K·m, and (c) is the specific heat capacity of said at least one bath electrode in W·s/m²·K.

2. A pot furnace according to claim 1 wherein:

(a) said at least one bath electrode extends outwardly of said pot beyond said cooling surface of said at least one bath electrode and
   (b) the time during which said cooling surface of said at least one bath electrode remains below the critical temperature (t*) in degrees K. at said cooling surface of said at least one bath electrode is determined by the formula:

$$\frac{t^* - t_K}{t_{max} - t_K} = 1 - \left\{ \frac{8}{\pi^2} \left[ 1^{-2} \cdot e^{-\frac{12 \cdot \pi^2 \cdot \lambda \cdot T}{4 \cdot c \cdot l_A^2}} + \right.\right.$$
$$\left.\left. 3^{-2} \cdot e^{-\frac{32 \cdot \pi^2 \cdot \lambda \cdot T}{4 \cdot c \cdot l_A^2}} + 5^{-2} \cdot e^{-\frac{52 \cdot \pi^2 \cdot \lambda \cdot T}{4 \cdot c \cdot l_A^2}} + \ldots \right]\right\}$$

wherein ($t_{max}$) is the temperature in degrees K. of said at least one bath electrode at the surface of the melted metal, ($t_K$) is the temperature in degrees K. at said cooling surface of said at least one bath electrode at the beginning of uncoupling of the external cooling, (T) is the uncoupling time in seconds, ($l_A$) is the length of said at least one bath electrode from the surface of the melted metal to said cooling surface of said at least one bath electrode in meters, ($l_Z$) is the length of the extension of said at least one bath electrode beyond said cooling surface of said at least one bath electrode in meters, ($\lambda$) is the heat conductivity of said at least one bath electrode in W/K·m, and (c) is the specific heat capacity of said at least one bath electrode in W·s/m²·K.

3. A pot furnace according to claim 1 and further comprising at least one cooling body attached to said at least one bath electrode.

4. A pot furnace according to claim 3 wherein said at least one cooling body is replaceably connected to the outside part of said at least one bath electrode.

5. A pot furnace according to claim 3 wherein said at least one cooling body is an electric connecting piece.

6. A pot furnace according to claim 3 wherein said at least one cooling body comprises a cooling chamber containing a material that melts at a preset limiting temperature.

7. A pot furnace according to claim 3 wherein said at least one cooling body is formed of a material having a relatively high heat conductivity.

8. A pot furnace according to claim 3 wherein said at least one cooling body is cooled externally.

9. A pot furnace according to claim 1 wherein the electrically conductive cross-section of said at least one bath electrode is smaller at its distal surface than at the external surface of said pot.

10. A pot furnace according to claim 1 wherein:
    (a) said at least one bath electrode has a circular cross-section and
    (b) the diameter of said at least one bath electrode is smaller at its distal surface than at the external surface of said pot.

* * * * *